March 22, 1949. A. POLLAK ET AL 2,464,828
METHOD OF PRODUCING LIGNIN FROM BLACK LIQUOR
Filed Feb. 22, 1944
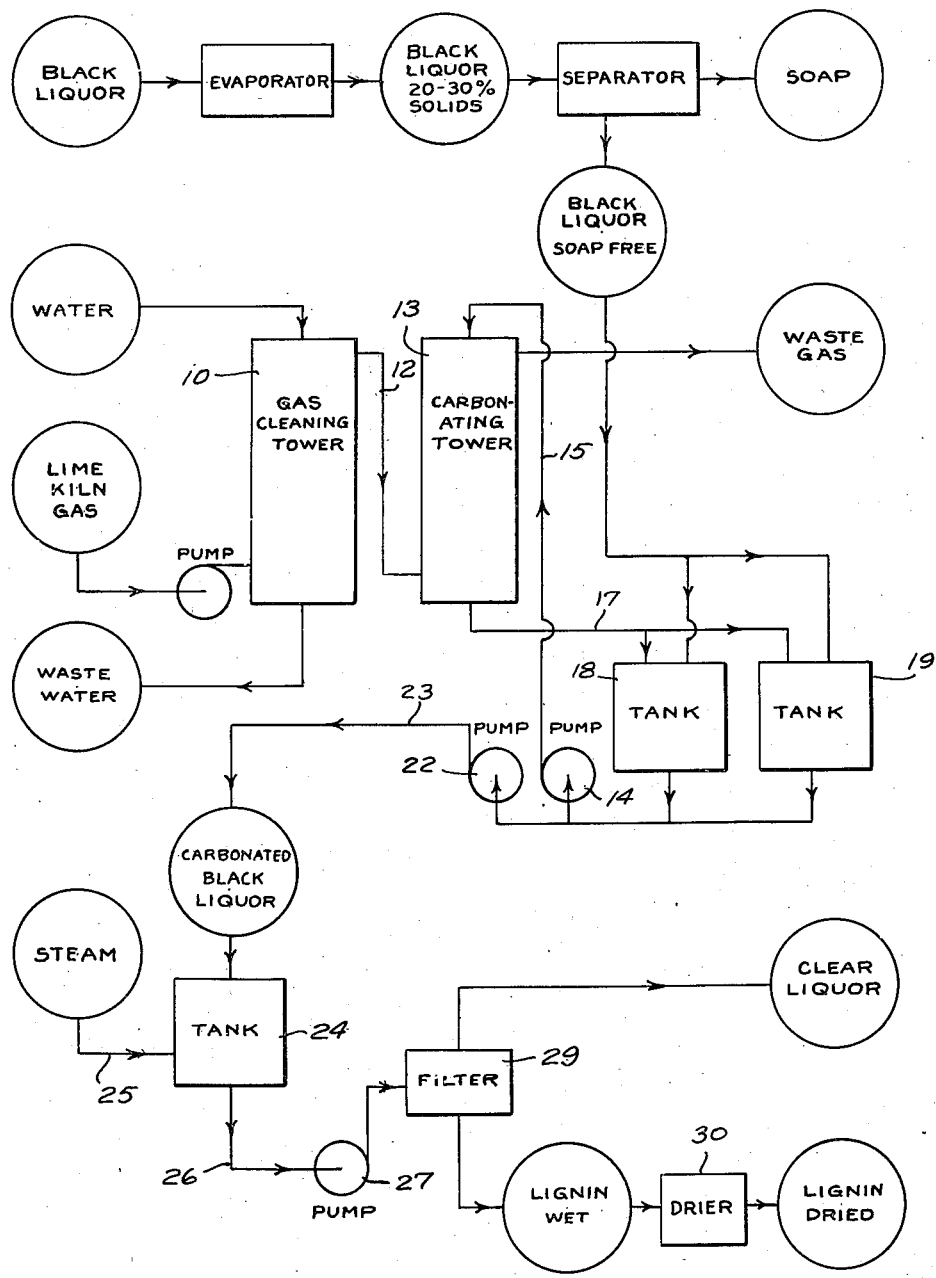
INVENTORS
ARTHUR POLLAK
JOHN J. KEILEN, JR.
LEWIS F. DRUM
BY
Moses, Nolte, Graves & Berry
ATTORNEYS Patented Mar. 22, 1949

2,464,828

UNITED STATES PATENT OFFICE 2,464,828

METHOD OF PRODUCING LIGNIN FROM BLACK LIQUOR

Arthur Pollak, John J. Keilen, Jr., and Lewis F. Drum, Charleston, S. C., assignors to West Virginia Pulp and Paper Company, New York, N. Y., a corporation of Delaware Application February 22, 1944, Serial No. 523,488

3 Claims. (Cl. 260—124)

Our present invention relates to an improved method for producing lignin from black liquor, especially that obtained from the pulping of pine wood by the sulfate or soda process.

It has heretofore been the practice to precipitate the acid precipitable portion of black liquor, known as lignin, by carbonating the black liquor. One such method has been to bubble carbon dioxide gas or gas rich in carbon dioxide through the black liquor in a container and to allow the lignin to separate out.

It has also been proposed to carbonate the black liquor at comparatively low temperatures whereby the lignin is liberated but remains in colloidal suspension and thereafter heating the carbonated liquor whereby the lignin coagulates and precipitates.

The production of lignin from pine wood black liquor is complicated by the presence of the saponified fats and resins originally present in the wood. Unless special precautions are taken when lignin is sought from this source such saponified fats and resins precipitate with the lignin so that 1000 lbs. of lignin might be contaminated with as much as 150 lbs. of fatty and resin acids.

We propose to eliminate this contamination by first concentrating the black liquor to a solids content of 20 to 30% whereby the saponified fats and resins salt out and float to the surface from which they can be removed as by skimming.

The practice of others has been to bubble carbon dioxide-containing gases through vessels containing black liquor or to spray black liquor through such gases. By using a packed tower the carbonation process becomes much more effective. We have discovered that in some instances approximately ten times the power is needed to bubble gas through a tank of liquid as compared with that necessary to bring about the same amout of gas to liquid contact in a packed tower wherein the liquid is pumped countercurrent to ascending gases. A packed tower is also more effective than spraying black liquor through gases because the constant reformation of the gas to liquid boundary provides a much more efficient contact so that less gas and less power are required.

The production at a low cost of an uncontaminated lignin, especially from a concentrated pine wood black liquor, requires the economical utilization of an inexpensive source of carbon dioxide-containing gas, not fouled with tars or solids. When waste gases are utilized in which the percentage of carbon dioxide is comparatively low, the power consumption is substantial.

In our invention we carbonate the skimmed concentrated black liquor under conditions that make it possible (1) to utilize stack gases containing $CO_2$, as for example lime kiln gases; (2) to bring about carbonation in a packed tower whereby the gas under low pressure may be conducted to contact with the black liquor. Such packed towers may operate batchwise by circulating a tank of black liquor through them until carbonation is deemed sufficient or by proper design of these towers, the carbonation may be conducted continuously, the fresh, skimmed, concentrated black liquor entering at the top and being withdrawn, sufficiently carbonated, from the bottom.

While it is generally known that packed towers are efficiently contacting devices having a comparatively low power consumption, in the past their application to the carbonation of black liquor, especially that containing from 20 to 30% solids, has been impractical because it has not been possible to control their action so as to avoid clogging due to the frothing or precipitation of fats and resins or of lignin. In accordance with our present invention we overcome this difficulty by first blowing the hot waste gas, such as lime kiln stack gas which we prefer because it is comparatively rich in carbon dioxide, through a first packed tower or spray scrubber whereby the gas is cleaned of its dust, sulfur compounds, and other impurities, and cooled to saturation temperature or below. The resulting gas is then used for carbonation in one or more packed towers or similar device for the turbulent, non-stagnant contact of the gas and liquid. Since the cleaned gas is cool and saturated, it will not evaporate any appreciable quantities of water out of the black liquor even when the liquor enters hot. Also, at its wet bulb temperature or below the gas is not hot enough to coagulate the colloidal lignin in carbonated black liquor. Further, should the liquor enter hotter than the saturated gas it will immediately cool by the evaporation of a negligible quantity of water until it attains the gas temperature.

These conditions are illustrated in the example below, reference also being had to the accompanying drawing in the nature of a flow sheet explanatory thereof.

It is important to the economy of the carbonation process, especially when using gas in which carbon dioxide is not the principal component, to carbonate at temperatures not exceeding 150° F. in order to preserve a reasonably good rate of carbonation so that a sufficiently low pH can be reached in a reasonable time.

Referring now to the drawing, black liquor from the pulping of pine wood is evaporated to 20–30% solids, the saponified fats and resins are collected as a layer on the top of the concentrated liquor in a suitable container, and the soaps are removed by skimming or other method, thereby producing a comparatively soap-free black liquor containing the lignin which it is desired to recover. At the same time gases from a lime kiln, for example, are admitted to the bottom of gas cleaning tower 10 containing a suitable filling material, as for example tile rings, such gas passing upwardly through the tower and being washed with water admitted to the top thereof, the water being at least in excess of the quantity required to saturate the gas so that the saturated gas will be at its wet bulb temperature or below, not substantially in excess of 150° F. The gases thereupon pass through pipe 12 to the bottom of tower 13 of similar construction to tower 10 and packed with tile slats. The cleaned gases passing upwardly through tower 13 meet the skimmed black liquor which is pumped by pump 14 through pipe 15 to the top of tower 13. Here the black liquor is carbonated, the carbonation being considered sufficient when the pH of the liquor has dropped to around 9. The carbonated black liquor leaves the tower through the pipe 17 and passes therethrough to either of carbonating tanks 18, 19, one of said tanks serving in alternation as reservoir for the uncarbonated black liquor and the other as a reservoir for the carbonated liquor, the piping to said tanks being provided with suitable valves, not shown. Finally, by means of the piping shown the liquor may be subjected to more than one pass through the tower 13.

Thus during one experiment the following temperatures prevailed:

Gas entering scrubber_____°F__ 180 to 260
Water entering scrubber_____°F__ 85
Gas leaving scrubber and entering carbonating tower_____°F__ 90 to 110
Black liquor entering tower_____°F__ 170
Black liquor leaving tower_____°F__ 120
pH of black liquor after carbonation_____ 9.0

From this it will be seen that both the gas and the liquor were cooled and thus carbonation readily proceeded to a pH of 9.0. In general a pH from 10 down to 8 or below will be satisfactory.

The carbonation having been completed, the black liquor is passed by pump 22 and line 23 to tank 24 into which is passed steam through line 25. Here the temperature of the carbonated liquor is increased until coagulation has reached the degree where a readily filterable precipitate is formed. This usually develops in the temperature range of 160 to 200° F., the preferred temperature being governed by the source of the black liquor, the rate of heating and other operating conditions. The liquor and coagulant are then allowed to cool to further improve filtration and passed from the tank 24 through pipe 26, pump 27, to filter 29 in which the crude lignin is recovered, which may be either dried in drier 30 or subjected to such other purification as may be desired, with which the present invention is not concerned.

The moisture content of the substantially saturated and cleaned gases at the wet bulb temperature not substantially in excess of 150° F. thus serves to prevent evaporation as well as overheating of the black liquor in the tower 13 where carbonation takes place with the minimum of power expended. Should either overheating or appreciable evaporation occur in the tower, either the lignin or other solids would precipitate in the tower thereby choking it up.

We claim:

1. In the recovery of lignin from black liquor derived from the pulping of pine wood, the steps of concentrating the said liquor at least to the point at which the saponified resins salt out, allowing such soaps to separate and removing same, scrubbing hot carbon dioxide-containing gas with sufficient water to reduce the gas to below its dew point temperature of not in excess of 150° F. thereby saturating same, then passing the thus saturated gas in a turbulent flow through an absorption tower countercurrent to a flow therein of said liquor thereby to carbonate the liquor without substantial evaporation thereof whereby precipitation of the lignin and other solids is avoided, removing the thus carbonated liquor from said tower and thereafter coagulating and precipitating the lignin contained therein by heating said carbonated liquor.

2. The method according to claim 1, in which the treated black liquor admitted to the absorption tower contains from 20 to 30 per cent solids.

3. The method according to claim 1, in which the carbonation of the black liquor is carried to a point at which the pH of the liquor is between 8 and 10.

ARTHUR POLLAK.
JOHN J. KEILEN, JR.
LEWIS F. DRUM.

REFERENCES CITED

The following references are of record in the file of this patent:

UNITED STATES PATENTS

| Number | Name | Date |
|---|---|---|
| 1,005,882 | Rinman | Oct. 17, 1911 |
| 2,036,517 | Colman | Apr. 7, 1936 |
| 2,161,749 | Samaras | June 6, 1939 |
| 2,201,797 | Scott | May 21, 1940 |
| 2,228,976 | Reboulet | Jan. 14, 1941 |
| 2,248,978 | Francisco | July 15, 1941 |